United States Patent
Lu

(10) Patent No.: US 11,199,942 B2
(45) Date of Patent: Dec. 14, 2021

(54) METHOD AND SYSTEM FOR SORTING DESKTOP OBJECTS

(71) Applicant: Huawei Technologies Co., Ltd., Shenzhen (CN)

(72) Inventor: Ting Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/788,828

(22) Filed: Feb. 12, 2020

(65) Prior Publication Data

US 2020/0183568 A1  Jun. 11, 2020

Related U.S. Application Data

(63) Continuation of application No. 14/984,385, filed on Dec. 30, 2015, now Pat. No. 10,579,209, which is a
(Continued)

(30) Foreign Application Priority Data

Dec. 6, 2013  (CN) .......................... 201310658653.4

(51) Int. Cl.
*G06F 3/0482* (2013.01)
*G06F 3/0481* (2013.01)
(Continued)

(52) U.S. Cl.
CPC ........ *G06F 3/04817* (2013.01); *G06F 3/0482* (2013.01); *G06F 3/0488* (2013.01);
(Continued)

(58) Field of Classification Search
CPC .... G06F 3/04817; G06F 3/04883; G06F 9/44; G06F 9/451; G06F 3/0482;
(Continued)

(56) References Cited

U.S. PATENT DOCUMENTS

| 2006/0068876 A1 | 3/2006 | Kane et al. |
| 2010/0062811 A1 | 3/2010 | Park et al. |

(Continued)

FOREIGN PATENT DOCUMENTS

| CN | 102033692 A | 4/2011 |
| CN | 102880396 A | 1/2013 |

(Continued)

OTHER PUBLICATIONS

"Samsung Galaxy Tab 8.9 Android Tablet User Manual," Samsung Electronics America, Inc, 2011, New Jersey, USA, 188 pages.
(Continued)

*Primary Examiner* — Jennifer N Welch
*Assistant Examiner* — Amy P Hoang
(74) *Attorney, Agent, or Firm* — Conley Rose, P.C.

(57) ABSTRACT

A method includes acquiring a desktop thumbnail of each desktop screen in a desktop screen set, and collectively displaying all the acquired desktop thumbnails on a desktop home screen; listening to a sequence of tapping operations performed on the desktop thumbnails displayed on the desktop home screen, and determining a tapping location of each tapping operation in the sequence of tapping operations; and sorting and displaying, according to the tapping location of each tapping operation in the sequence of tapping operations, desktop objects that are on each desktop screen on a multi-screen desktop. Desktop thumbnails of desktop screens in a desktop screen set are collectively displayed on a desktop home screen such that desktop objects on each desktop screen on a multi-screen desktop can be sorted and displayed by performing a tapping operation on the desktop home screen.

20 Claims, 8 Drawing Sheets

Related U.S. Application Data continuation of application No. PCT/CN2014/093216, filed on Dec. 8, 2014.

(51) Int. Cl.
  *G06F 3/0488* (2013.01)
  *G06F 9/44* (2018.01)
  *G06F 9/451* (2018.01)
  *G06F 3/0484* (2013.01)

(52) U.S. Cl.
  CPC ...... *G06F 3/04842* (2013.01); *G06F 3/04883* (2013.01); *G06F 9/44* (2013.01); *G06F 9/451* (2018.02); *G06F 2203/04806* (2013.01); *G06F 2203/04808* (2013.01)

(58) Field of Classification Search
  CPC .............. G06F 3/04842; G06F 3/0488; G06F 2203/04806; G06F 2203/04808; G06F 3/0484
  See application file for complete search history.

(56) References Cited

U.S. PATENT DOCUMENTS

| | | | |
|---|---|---|---|
| 2011/0061010 A1* | 3/2011 | Wasko | G06F 3/0482 715/769 |
| 2012/0079432 A1 | 3/2012 | Lee et al. | |
| 2012/0188275 A1* | 7/2012 | Shimazu | G06F 3/0488 345/629 |
| 2013/0055073 A1 | 2/2013 | Yan et al. | |
| 2014/0019895 A1 | 1/2014 | Honda | |
| 2014/0320418 A1* | 10/2014 | Tseng | G06F 3/04883 345/173 |
| 2015/0212691 A1 | 7/2015 | Wang et al. | |
| 2020/0064975 A1* | 2/2020 | Sirpal | G06F 3/04845 |

FOREIGN PATENT DOCUMENTS

| | | |
|---|---|---|
| CN | 102955691 A | 3/2013 |
| CN | 103119541 A | 5/2013 |
| CN | 103164114 A | 6/2013 |
| CN | 103324404 A | 9/2013 |
| CN | 103605804 A | 2/2014 |
| EP | 2645221 A1 | 10/2013 |
| WO | 2013162200 A1 | 10/2013 |

OTHER PUBLICATIONS

Foreign Communication From a Counterpart Application, PCT Application No. PCT/CN2014/093216, dated Feb. 26, 2015, 2 pages.

Foreign Communication From a Counterpart Application, Chinese Application No. 201310658653.4, Chinese Office Action dated May 9, 2016, 7 pages.

Extended European Search Report dated Aug. 31, 2016 in corresponding European Patent Application No. 14868397.2, 2 pages.

Chinese Office Action dated May 25, 2017 in corresponding Chinese Patent Application No. 201310658653.4, 8 pages.

\* cited by examiner

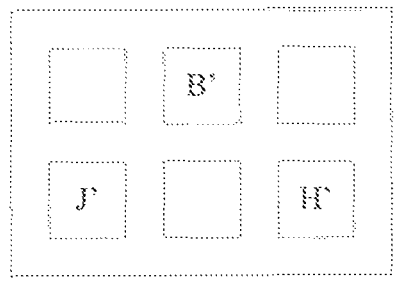

FIG. 7C

| Group a sequence of tapping operations into several groups of tapping operation pairs by using an odd-even matching rule | — S301 |

↓

| For each group of tapping operation pairs, determine, according to a desktop thumbnail tapped in each tapping operation in the tapping operation pair and location coordinates in the tapped desktop thumbnail, a desktop object thumbnail tapped in the tapping operation | — S302 |

↓

| For each group of tapping operation pairs, exchange locations of the desktop object thumbnails tapped in the tapping operations in the tapping operation pair | — S303 |

↓

| Sort and display, according to each desktop thumbnail displayed on a desktop home screen and a desktop object thumbnail included in the desktop thumbnail, desktop objects on a desktop screen that is in a desktop screen set and is corresponding to each desktop thumbnail | — S304 |

FIG. 8

METHOD AND SYSTEM FOR SORTING DESKTOP OBJECTS

CROSS-REFERENCE TO RELATED APPLICATIONS

This application is a continuation of U.S. patent application Ser. No. 14/984,385 filed on Dec. 30, 2015, which is a continuation of International Patent Application No. PCT/CN2014/093216 filed on Dec. 8, 2014, which claims priority to Chinese Patent Application No. 201310658653.4 filed on Dec. 6, 2013. All of the aforementioned applications are hereby incorporated by reference in their entireties.

TECHNICAL FIELD

Embodiments of the present disclosure relate to the field of terminal application, and in particular, to a method and system for sorting desktop objects.

BACKGROUND

ANDROID, as an open operating system, has been increasingly widely used in terminal devices. With gradual increase of application programs, for a terminal device (for example, an ANDROID smart phone) using an ANDROID operating system, to operate, in a more convenient and quick manner, application programs installed on the terminal device, a multi-screen desktop design is used for an existing terminal device using an ANDROID operating system. The multi-screen desktop design means that a desktop is divided into several desktop screens, where each desktop screen is used to display a desktop object, one desktop screen is a one-screen desktop, and multiple desktop screens form a multi-screen desktop. The desktop object refers to an object that needs to be displayed on the desktop, and the desktop object includes but is not limited to a shortcut icon of an application program, a file, a folder, and the like. In the terminal device using a multi-screen desktop design, how to sort desktop objects on a multi-screen desktop is a difficulty to be resolved for the existing terminal device using a multi-screen desktop design.

A method for sorting desktop objects is generally setting a desktop object in a first location to a draggable state first, and then dragging the desktop object in the first location to a second location, so as to achieve an objective of moving the desktop object from the first location to the second location. For a terminal device using a multi-screen desktop design, this manner has problems of a complex operation, high time consumption, and a high locating error rate. If an application program icon A on a first desktop screen is to be moved to a blank area on a fifth desktop screen, it is required to touch and hold down the application program icon A to set the application program icon A to a draggable state; drag the application program icon A to a screen edge, so as to drag the application program icon A from the first desktop screen to a second desktop screen; and continue to drag the application program icon A that has been dragged to the second desktop screen to a screen edge, so as to drag the application program icon A from the second desktop screen to a third desktop screen. By analogy, the application program icon A can be dragged to the fifth desktop screen only after four times of desktop screen switching are performed; and finally, the application program icon A is released in the blank area on the fifth desktop screen, so that the application program icon A on the first desktop screen can be moved to the blank area on the fifth desktop screen. For another example, if locations of an application program icon A and an application program icon B are to be exchanged, it is required to first touch and hold down the application program icon A to set the application program icon A to a draggable state, drag the application program icon A to a blank area, and then drag the application program icon B to a start location of the application program icon A; and finally, move, to a start location of the application program icon B, the application program icon A that has been dragged. After the foregoing processes end, location exchange of application program icons is complete.

SUMMARY

Embodiments of the present disclosure provide a method and a system for sorting desktop objects, which is intended to resolve a problem of a complex operation and high time consumption in an existing method for sorting desktop objects.

According to a first aspect, a method for sorting desktop objects is provided, where the method includes acquiring a desktop thumbnail of each desktop screen in a desktop screen set, and collectively displaying all the acquired desktop thumbnails on a desktop home screen, where the desktop screen set includes at least one desktop screen on a multi-screen desktop, the desktop thumbnail of the desktop screen includes a desktop object thumbnail that is in a one-to-one correspondence with a desktop object on the desktop screen, and the desktop home screen is any desktop screen on the multi-screen desktop; listening to a sequence of tapping operations performed on the desktop thumbnails displayed on the desktop home screen, and determining a tapping location of each tapping operation in the sequence of tapping operations, where the tapping location includes a tapped desktop thumbnail and location coordinates that are of the tapping operation and are in the tapped desktop thumbnail; and sorting and displaying, according to the tapping location of each tapping operation in the sequence of tapping operations, desktop objects that are on each desktop screen on the multi-screen desktop.

With reference to the first aspect, in a first possible implementation manner of the first aspect, the acquiring a desktop thumbnail of each desktop screen in a desktop screen set includes performing zooming-out processing on each desktop screen in the desktop screen set and the desktop object on the desktop screen according to a preset zoom ratio, to obtain the desktop thumbnail of each desktop screen in the desktop screen set; and scanning the desktop thumbnail of each desktop screen in the desktop screen set, to acquire a screen identifier and first location information that are of the desktop thumbnail, where the first location information is information about a location that is of the desktop object thumbnail included in the desktop thumbnail and that is in the desktop thumbnail.

With reference to the first possible implementation manner of the first aspect, in a second possible implementation manner of the first aspect, the collectively displaying all the acquired desktop thumbnails on a desktop home screen includes displaying, on the desktop home screen, a window interface that is in a one-to-one correspondence with the desktop thumbnail of each desktop screen in the desktop screen set; and correspondingly displaying, according to the screen identifier of the desktop thumbnail, the acquired desktop thumbnails on the window interface that is on the desktop home screen, and displaying, on the desktop thumbnail according to the first location information, the desktop object thumbnail that is in the desktop thumbnail.

With reference to the first aspect, in a third possible implementation manner of the first aspect, the sequence of tapping operations includes several tapping operations with tapping order, each tapping operation may be performed on one or more desktop thumbnails, and each tapping operation may include multiple tapping locations.

With reference to the third possible implementation manner of the first aspect, in a fourth possible implementation manner of the first aspect, the sorting and displaying, according to the tapping location of each tapping operation in the sequence of tapping operations, desktop objects that are on each desktop screen on the multi-screen desktop includes grouping the sequence of tapping operations into several tapping operation pairs using an odd-even matching rule; for each tapping operation pairs, determining, according to a desktop thumbnail tapped in each tapping operation in the tapping operation pair, a desktop screen tapped in the tapping operation, and determining, according to location coordinates that are of each tapping operation and are in the tapped desktop thumbnail, a location tapped on the tapped desktop screen in the tapping operation; and for each tapping operation pairs, exchanging locations of desktop objects that are in the locations tapped on the tapped desktop screens in the tapping operations in the tapping operation pair.

With reference to the third possible implementation manner of the first aspect, in a fifth possible implementation manner of the first aspect, the sorting and displaying, according to the tapping location of each tapping operation in the sequence of tapping operations, desktop objects that are on each desktop screen on the multi-screen desktop includes grouping the sequence of tapping operations into several tapping operation pairs using an odd-even matching rule; for each tapping operation pairs, determining, according to a desktop thumbnail tapped in each tapping operation in the tapping operation pair and location coordinates that are of the tapping operation and are in the tapped desktop thumbnail, a desktop object thumbnail tapped in the tapping operation; for each tapping operation pairs, exchanging locations of the desktop object thumbnails tapped in the tapping operations in the tapping operation pair; and sorting and displaying, according to each desktop thumbnail displayed on the desktop home screen and the desktop object thumbnail included in the desktop thumbnail, desktop objects on a desktop screen that is in the desktop screen set and is corresponding to the desktop thumbnail.

With reference to the fifth possible implementation manner of the first aspect, in a sixth possible implementation manner of the first aspect, the sorting and displaying, according to the desktop thumbnail that is of each desktop screen and is displayed on the desktop home screen and the desktop object thumbnail included in the desktop thumbnail, desktop objects on a corresponding desktop screen in the desktop screen set includes acquiring a screen identifier and second location information that are of the desktop thumbnail, where the second location information is information about a location that is of the desktop object thumbnail in the desktop thumbnail and that is in the desktop thumbnail; and displaying, according to the second location information and on a desktop screen corresponding to the screen identifier, a desktop object that is in a one-to-one correspondence with the desktop object thumbnail in the desktop thumbnail.

According to a second aspect, a system for sorting desktop objects is provided, where the system includes a displaying unit configured to acquire a desktop thumbnail of each desktop screen in a desktop screen set, and collectively display all the acquired desktop thumbnails on a desktop home screen, where the desktop screen set includes at least one desktop screen on a multi-screen desktop, the desktop thumbnail of the desktop screen includes a desktop object thumbnail that is in a one-to-one correspondence with a desktop object on the desktop screen, and the desktop home screen is any desktop screen on the multi-screen desktop; a listening unit configured to listen to a sequence of tapping operations performed on the desktop thumbnails displayed on the desktop home screen, and determine a tapping location of each tapping operation in the sequence of tapping operations, where the tapping location includes a tapped desktop thumbnail and location coordinates that are of the tapping operation and are in the tapped desktop thumbnail; and a sorting unit configured to sort and display, according to the tapping location of each tapping operation in the sequence of tapping operations, desktop objects that are on each desktop screen on the multi-screen desktop.

With reference to the second aspect, in a first possible implementation manner of the second aspect, the displaying unit includes a thumbnail processing module configured to perform zooming-out processing on each desktop screen in the desktop screen set and the desktop object on the desktop screen according to a preset zoom ratio, to obtain the desktop thumbnail of each desktop screen in the desktop screen set; and a thumbnail acquiring module configured to scan the desktop thumbnail of each desktop screen in the desktop screen set, to acquire a screen identifier and first location information that are of the desktop thumbnail, where the first location information is information about a location that is of the desktop object thumbnail included in the desktop thumbnail and that is in the desktop thumbnail.

With reference to the first possible implementation manner of the second aspect, in a second possible implementation manner of the second aspect, the displaying unit further includes a window displaying module, configured to display, on the desktop home screen, a window interface that is in a one-to-one correspondence with the desktop thumbnail of each desktop screen in the desktop screen set; and a thumbnail displaying module, configured to correspondingly display, according to the screen identifier of the desktop thumbnail, the acquired desktop thumbnails on the window interface that is on the desktop home screen, and display, on the desktop thumbnail according to the first location information, the desktop object thumbnail that is in the desktop thumbnail.

With reference to the second aspect, in a third possible implementation manner of the second aspect, the sequence of tapping operations includes several tapping operations with tapping order, each tapping operation may be performed on one or more desktop thumbnails, and each tapping operation may include multiple tapping locations.

With reference to the third possible implementation manner of the second aspect, in a fourth possible implementation manner of the second aspect, the sorting unit includes an operation pair grouping module configured to group the sequence of tapping operations into several tapping operation pairs using an odd-even matching rule; a tapping location determining module configured to, for each tapping operation pairs, determine, according to a desktop thumbnail tapped in each tapping operation in the tapping operation pair, a desktop screen tapped in the tapping operation, and determine, according to location coordinates that are of each tapping operation and are in the tapped desktop thumbnail, a location tapped on the tapped desktop screen in the tapping operation; and a location exchanging module configured to, for each tapping operation pairs, exchange locations of desktop objects that are in the locations tapped on the tapped desktop screens in the tapping operations in the tapping operation pair.

With reference to the third possible implementation manner of the second aspect, in a fifth possible implementation manner of the second aspect, the sorting unit includes an operation pair grouping module configured to group the sequence of tapping operations into several tapping operation pairs using an odd-even matching rule; a tapped-thumbnail determining module configured to, for each tapping operation pairs, determine, according to a desktop thumbnail tapped in each tapping operation in the tapping operation pair and location coordinates that are of the tapping operation and are in the tapped desktop thumbnail, a desktop object thumbnail tapped in the tapping operation; a thumbnail location exchanging module configured to, for each tapping operation pairs, exchange locations of the desktop object thumbnails tapped in the tapping operations in the tapping operation pair; and a sorting and displaying module configured to sort and display, according to each desktop thumbnail displayed on the desktop home screen and the desktop object thumbnail included in the desktop thumbnail, desktop objects on a desktop screen that is in the desktop screen set and is corresponding to the desktop thumbnail.

With reference to the fifth possible implementation manner of the second aspect, in a sixth possible implementation manner of the second aspect, the sorting and displaying module is specifically configured to acquire a screen identifier and second location information that are of the desktop thumbnail, where the second location information is information about a location that is of the desktop object thumbnail in the desktop thumbnail and that is in the desktop thumbnail; and display, according to the second location information and on a desktop screen corresponding to the screen identifier, a desktop object that is in a one-to-one correspondence with the desktop object thumbnail in the desktop thumbnail.

In the embodiments of the present disclosure, desktop thumbnails of desktop screens in a desktop screen set are collectively displayed on a desktop home screen, and a sequence of tapping operations performed on the desktop thumbnails displayed on the desktop home screen is listened to; and desktop objects on each desktop screen on a multi-screen desktop are sorted and displayed according to a tapping location of each tapping operation in the sequence of tapping operations. It is only required to tap, on a desktop home screen, a desktop object thumbnail in a desktop thumbnail, so that desktop objects on each desktop screen on a multi-screen desktop can be sorted and displayed. Therefore, a sorting operation is simple, consumes less time, and has high locating accuracy.

BRIEF DESCRIPTION OF DRAWINGS

FIG. 7A, FIG. 7B, and FIG. 7C are exemplary diagrams of desktop screens obtained after sorting the desktop screens shown in FIG. 2a, FIG. 2b, and FIG. 2c;

FIG. 8 is a specific flowchart of implementing S103 shown in FIG. 1 according to another embodiment of the present disclosure;

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

In the embodiments of the present disclosure, desktop thumbnails of desktop screens on a multi-screen desktop are collectively displayed on a desktop home screen, so that a user does not need to drag a desktop object from one desktop screen to another desktop screen to exchange locations of desktop objects; instead, a desktop object thumbnail in the desktop thumbnail may be directly tapped on the desktop home screen to exchange locations of desktop objects on a same desktop screen or exchange locations of desktop objects on different desktop screens. Therefore, a sorting operation on desktop objects is simple, consumes less time, and has high locating accuracy.

To describe the technical solutions of the present disclosure, specific embodiments are used for description in the following.

Figure 1:
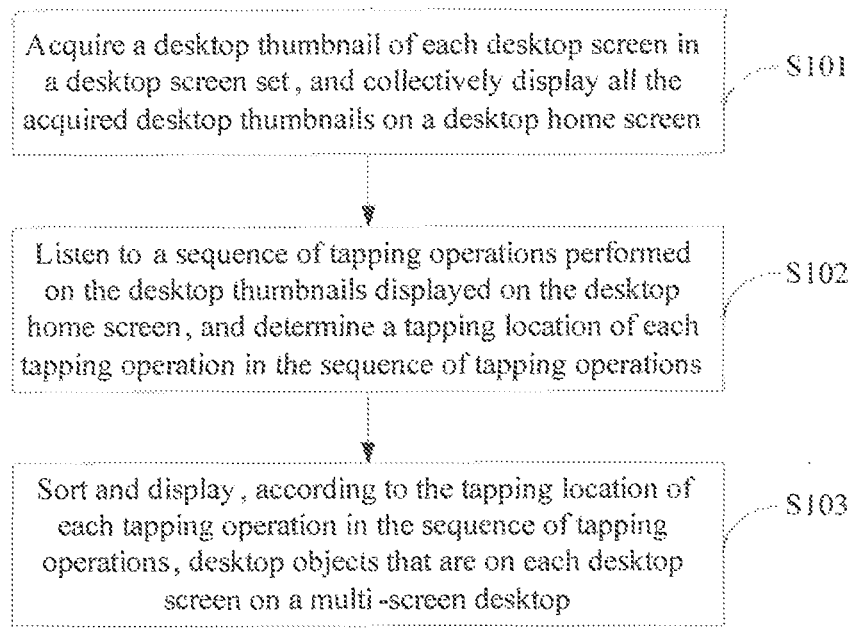
FIG. 1 is a flowchart of implementing a method for sorting desktop objects according to an embodiment of the present disclosure.

FIG. 1 shows a procedure for implementing a method for sorting desktop objects according to an embodiment of the present disclosure. Detailed descriptions are as follows.

S101. Acquire a desktop thumbnail of each desktop screen in a desktop screen set, and collectively display all the acquired desktop thumbnails on a desktop home screen, where the desktop screen set includes at least one desktop screen on a multi-screen desktop, and the desktop home screen is any desktop screen on the multi-screen desktop.

When a multi-screen desktop design is used for a desktop of a terminal device, the desktop of the terminal device is divided into multiple desktop screens, where each desktop screen is divided into multiple display areas according to a grid matrix of a P×Q order, and each display area is used to display one desktop object. A location that is of each display area used to display a desktop object and that is on the desktop screen is represented using a relative location in the grid matrix. The relative location in the grid matrix refers to a location represented using a row and column identifier of the grid matrix, for example, using the $X^{st}$ row and the $Y^{st}$ column to represent a location that is of each display area used to display a desktop object and that is on the desktop screen.

When there is a desktop object displayed on the display area, a location that is of the desktop object and that is on the desktop screen is a location that is of a display area used to display the desktop object and that is on the desktop screen.

Figure 2A:
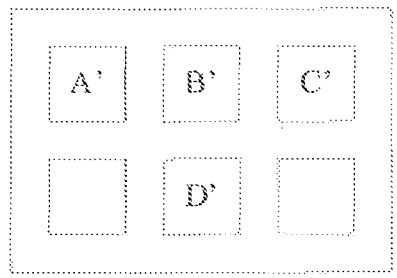
FIG. 2A, FIG. 2B, and FIG. 2C are exemplary diagrams of desktop screens according to an embodiment of the present disclosure.
Figure 2B:
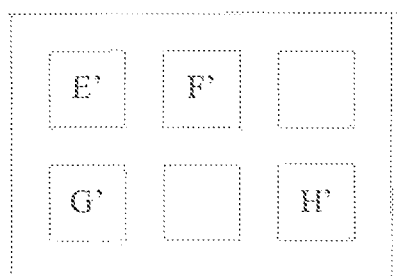
Figure 2C:
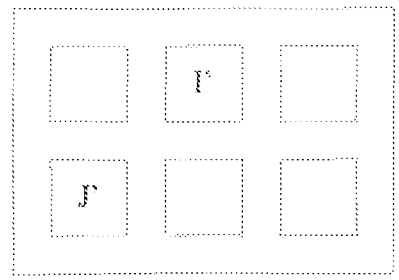

That a four-screen desktop design is used for the desktop of the terminal device is used as an example. The desktop of the terminal device includes four desktop screens, and FIG. 2A, FIG. 2B, and FIG. 2C represent any three desktop screens of the four desktop screens. In the desktop screens shown in FIG. 2A, FIG. 2B, and FIG. 2C, each of the desktop screens is divided into six display areas using a grid matrix of a 3×2 order, and the six display areas are respectively corresponding to six grids in FIG. 2A, FIG. 2B, and FIG. 2C, where a grid filled with a letter represents that a desktop object is displayed on the display area, and a grid without a letter represents a blank area.

In this embodiment, the desktop screen set includes one or more desktop screens on the multi-screen desktop. The desktop screen included in the desktop screen set may be all desktop screens on the multi-screen desktop, or may be a desktop screen, on which desktop objects need to be sorted, on the multi-screen desktop.

The desktop thumbnail of the desktop screen is obtained by performing zooming-out processing on the desktop screen and a desktop object on the desktop screen according to a preset zoom ratio. The desktop thumbnail of the desktop screen includes a desktop object thumbnail, where the desktop object thumbnail is in a one-to-one correspondence with the desktop object on the desktop screen.

In an embodiment provided in the present disclosure, a specific process of the acquiring a desktop thumbnail of each desktop screen in a desktop screen set may be as follows.

A1. Perform zooming-out processing on each desktop screen in the desktop screen set and the desktop object on the desktop screen according to a preset zoom ratio, to obtain the desktop thumbnail of each desktop screen in the desktop screen set.

In this embodiment, the preset zoom ratio may be set according to a screen size of the terminal device and a quantity of desktop screens included on the desktop of the terminal device.

A2. Scan the desktop thumbnail of each desktop screen in the desktop screen set, to acquire a screen identifier and first location information that are of the desktop thumbnail.

The screen identifier of the desktop thumbnail refers to an identifier of a desktop screen corresponding to the desktop thumbnail, and is used to represent that the desktop thumbnail is a desktop thumbnail of a desktop screen identified by the screen identifier.

The first location information is information about a location that is of the desktop object thumbnail included in the desktop thumbnail and that is in the desktop thumbnail, and the first location information is also represented using a relative location in a grid matrix. In this way, after zooming-out processing is performed on the desktop screen according to the preset zoom ratio, only a size of the desktop screen changes, but a quantity of orders of the grid matrix does not change, and therefore, a location that is of a desktop object and that is on the desktop screen is a location that is of a desktop object thumbnail corresponding to the desktop object and that is in the desktop thumbnail.

A specific form of the first location information may be the following triplet: (a screen identifier of a desktop thumbnail, an X-coordinate, and a Y-coordinate), where the screen identifier of the desktop thumbnail is used to represent a desktop thumbnail to which a desktop object thumbnail belongs, and the X-coordinate and the Y-coordinate are used to represent location coordinates that are of the desktop object thumbnail and that are in the desktop thumbnail to which the desktop object thumbnail belongs. The location coordinates are represented using a relative location in a grid matrix, where the X-coordinate represents a row coordinate in the grid matrix, and the Y-coordinate represents a column coordinate in the grid matrix.

That the desktop screen set includes three desktop screens is used as an example. Referring to FIG. 2A, FIG. 2B, and FIG. 2C, FIG. 2A, FIG. 2B, and FIG. 2C are three desktop screens whose screen identifiers are respectively 01, 02, and 03. Each of the three desktop screens is divided into six display areas according to a grid matrix of a 3×2 order. On a desktop screen whose screen identifier is 01 in FIG. 2A, a location that is of a desktop object B' and that is on the desktop screen is (1, 2), that is, the desktop object B' is located at a junction between the first row and the second column of the desktop screen shown in FIG. 2A. On a desktop screen whose screen identifier is 02 in FIG. 2B, a location that is of a desktop object E' and that is on the desktop screen is (1, 1), that is, the desktop object E' is located at a junction between the first row and the first column of the desktop screen shown in FIG. 2B. On a desktop screen whose screen identifier is 03 in FIG. 2C, a location that is of a desktop object I' and that is on the desktop screen is (1, 2), that is, the desktop object I' is located at a junction between the first row and the second column of the desktop screen shown in FIG. 2C.

Figure 3A:
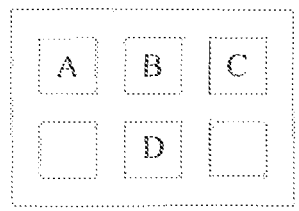
FIG. 3A, FIG. 3B, and FIG. 3C are desktop thumbnails of the desktop screens shown in FIG. 2A, FIG. 2B, and FIG. 2C.
Figure 3B:
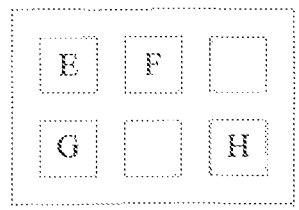
Figure 3C:
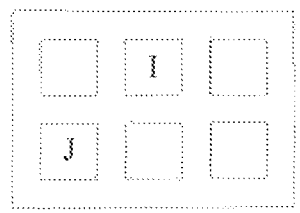

After zooming-out processing is performed on the desktop screens shown in FIG. 2A, FIG. 2B, and FIG. 2C and desktop objects on the desktop screens according to the preset zoom ratio, desktop thumbnails, shown in FIG. 3A, FIG. 3B, and FIG. 3C, of the desktop screens are obtained. A desktop object thumbnail included in the desktop thumbnail shown in FIG. 3A is in a one-to-one correspondence with the desktop object on the desktop screen shown in FIG. 2A, for example, a desktop object thumbnail B included in the desktop thumbnail shown in FIG. 3A is corresponding to the desktop object B' on the desktop screen shown in FIG. 2A. A desktop object thumbnail included in the desktop thumbnail shown in FIG. 3B is in a one-to-one correspondence with the desktop object on the desktop screen shown in FIG. 2B; for example, a desktop object thumbnail E included in the desktop thumbnail shown in FIG. 3B is corresponding to the desktop object E' on the desktop screen shown in FIG. 2B. A desktop object thumbnail included in the desktop thumbnail shown in FIG. 3C is in a one-to-one correspondence with the desktop object on the desktop screen shown in FIG. 2C; for example, a desktop object thumbnail I included in the desktop thumbnail shown in FIG. 3C is corresponding to the desktop object I' on the desktop screen shown in FIG. 2C.

Because a relative location in a grid matrix is also used for location coordinates that are of the desktop object thumbnail and that are in the desktop thumbnail to which the desktop object thumbnail belongs, the location coordinates that are of the desktop object thumbnail and that are in the desktop thumbnail are location coordinates that are of a desktop object corresponding to the desktop object thumbnail and that are on the desktop screen. For example, location coordinates that are of the desktop object thumbnail B and that are in the desktop thumbnail shown in FIG. 3A are the same as location coordinates that are of the desktop object B' and that are on the desktop screen shown in FIG. 2A, where the location coordinates are (1, 2); in this way, first location information of the desktop object thumbnail B is (01, 1, 2), and the desktop object thumbnail B is at a junction between the first row and the second column of the desktop thumbnail shown in FIG. 3A. Location coordinates that are of the desktop object thumbnail E and that are in the desktop thumbnail shown in FIG. 3B are the same as location coordinates that are of the desktop object E' and that are on the desktop screen shown in FIG. 2B, where the location coordinates are (1, 1); in this way, first location information of the desktop object thumbnail E is (02, 1, 1). Location coordinates that are of the desktop object thumbnail I and that are in the desktop thumbnail shown in FIG. 3C are the same as location coordinates that are of the desktop object I' and that are on the desktop screen shown in FIG. 2C, where the location coordinates are (1, 2); in this way, first location information of the desktop object thumbnail I is (03, 1, 2).

In an embodiment provided in the present disclosure, a specific process of the collectively displaying all the acquired desktop thumbnails on a desktop home screen may be as follows.

B1: Display, on the desktop home screen, a window interface that is in a one-to-one correspondence with the desktop thumbnail of each desktop screen in the desktop screen set.

A quantity of window interfaces displayed on the desktop home screen is the same as a quantity of acquired desktop thumbnails.

B2: Correspondingly display, according to the screen identifier of the desktop thumbnail, the acquired desktop thumbnails on the window interface that is on the desktop home screen, and display, on the desktop thumbnail according to the first location information, the desktop object thumbnail that is in the desktop thumbnail.

Figure 4:
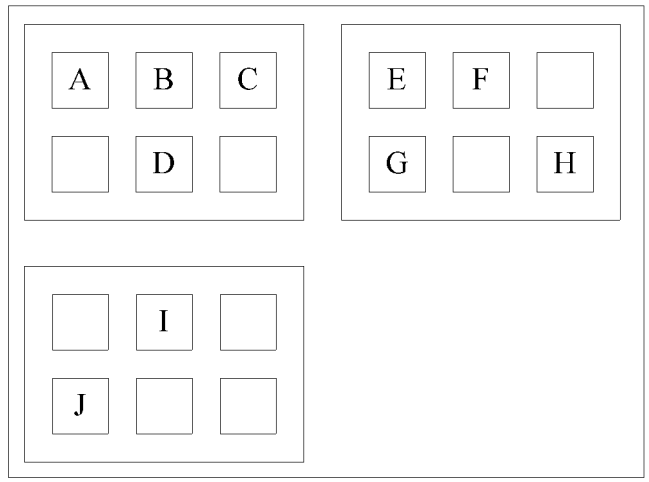
FIG. 4 is an exemplary diagram formed after the desktop thumbnails shown in FIG. 3A, FIG. 3B, and FIG. 3C are displayed on a desktop home screen.

Referring to FIG. 4, FIG. 4 is an exemplary diagram of collectively displaying, on the desktop home screen, the desktop thumbnails shown in FIG. 3A, FIG. 3B, and FIG. 3C according to an embodiment of the present disclosure. Because all the acquired desktop thumbnails are collectively displayed on the desktop home screen, a user can more intuitively and clearly see, using the desktop home screen, a desktop screen included on the desktop of the terminal device and a desktop object on each desktop screen, so that a desktop object whose location needs to be changed can be located more accurately.

S102. Listen to a sequence of tapping operations performed on the desktop thumbnails displayed on the desktop home screen, and determine a tapping location of each tapping operation in the sequence of tapping operations. The tapping location includes a tapped desktop thumbnail and location coordinates that are of the tapping operation and are in the tapped desktop thumbnail.

Specifically, a specific form of a tapping location of each tapping operation may be the following triplet: (a screen identifier of a desktop thumbnail, an X-coordinate, and a Y-coordinate). The screen identifier of the desktop thumbnail represents a desktop thumbnail tapped in the tapping operation, the X-coordinate and the Y-coordinate represent location coordinates that are of the tapping operation and that are in the tapped desktop thumbnail. The location coordinates are represented using a relative location in a grid matrix, where the X-coordinate represents a row coordinate in the grid matrix, and the Y-coordinate represents a column coordinate in the grid matrix.

In this embodiment, after the acquired desktop thumbnails are collectively displayed on the desktop home screen, the sequence of tapping operations performed on the desktop thumbnails displayed on the desktop home screen is listened to, and the tapping location of each tapping operation in the sequence of tapping operations is determined. The sequence of tapping operations includes several tapping operations with tapping order.

A specific process of the determining a tapping location of each tapping operation may be as follows: acquiring location coordinates that are of the tapping operation and that are on a screen used to display the desktop home screen, determining a desktop thumbnail displayed at the location coordinates and a desktop object thumbnail displayed at the location coordinates, and acquiring location coordinates that are of the desktop object thumbnail displayed at the location coordinates and that are in the desktop thumbnail displayed at the location coordinates, where the desktop thumbnail displayed at the location coordinates is the desktop thumbnail tapped in the tapping operation, and the location coordinates that are of the desktop object thumbnail displayed at the location coordinates and that are in the desktop thumbnail displayed at the location coordinates are location coordinates that are of the tapping operation and that are in the tapped desktop thumbnail.

A tapping operation may be performed on one or more desktop thumbnails, and a tapping operation may include multiple tapping locations. In this way, in one tapping operation, one or more desktop object thumbnails on the desktop home screen may be selected. Exemplary descriptions are as follows.

It is assumed that, after the acquired desktop thumbnails are collectively displayed on the desktop home screen, as shown in FIG. 4, when a user selects once, on the desktop home screen shown in FIG. 4, multiple desktop object thumbnails in the desktop thumbnail corresponding to the desktop screen 01, the tapping operation includes multiple tapping locations, and the multiple tapping locations are locations that are of the multiple desktop object thumbnails on which the tapping operation is performed and that are in the desktop thumbnail corresponding to the desktop screen 01. In this embodiment, one or more desktop object thumbnails on the desktop home screen may be selected using one tapping operation, which facilitates subsequent location exchange performed, according to the one or more desktop object thumbnails on the desktop home screen that are selected in the tapping operation, on desktop objects that are in a one-to-one correspondence with the one or more desktop object thumbnails, so that locations of desktop objects can be exchanged in batches.

S103. Sort and display, according to the tapping location of each tapping operation in the sequence of tapping operations, desktop objects that are on each desktop screen on the multi-screen desktop.

In this embodiment, because each desktop thumbnail displayed on a desktop home screen is in a one-to-one correspondence with a desktop screen, and a desktop object thumbnail in each desktop thumbnail is in a one-to-one correspondence with a desktop object on the desktop screen, after a tapping location of each tapping operation in a sequence of tapping operations is acquired, a desktop screen tapped in the tapping operation may be determined according to a desktop thumbnail tapped in the tapping operation, and a desktop object tapped on the tapped desktop screen in the tapping operation may be determined according to location coordinates of the desktop thumbnail tapped in the tapping operation. In this way, locations of desktop objects on each desktop screen on a multi-screen desktop may be exchanged according to the tapping location of each tapping operation in the sequence of tapping operations, so as to achieve an objective of sorting and displaying desktop objects on each desktop screen on the multi-screen desktop.

In this embodiment of the present disclosure, desktop thumbnails of desktop screens on a multi-screen desktop are collectively displayed on a desktop home screen, so that a user does not need to drag a desktop object from one desktop screen to another desktop screen to exchange locations of desktop objects; instead, a desktop object thumbnail in the desktop thumbnail may be directly tapped on the desktop home screen to exchange locations of desktop objects on a same desktop screen or exchange locations of desktop objects on different desktop screens. Therefore, a sorting operation on desktop objects is simple, consumes less time, and has high locating accuracy.

Figure 5:
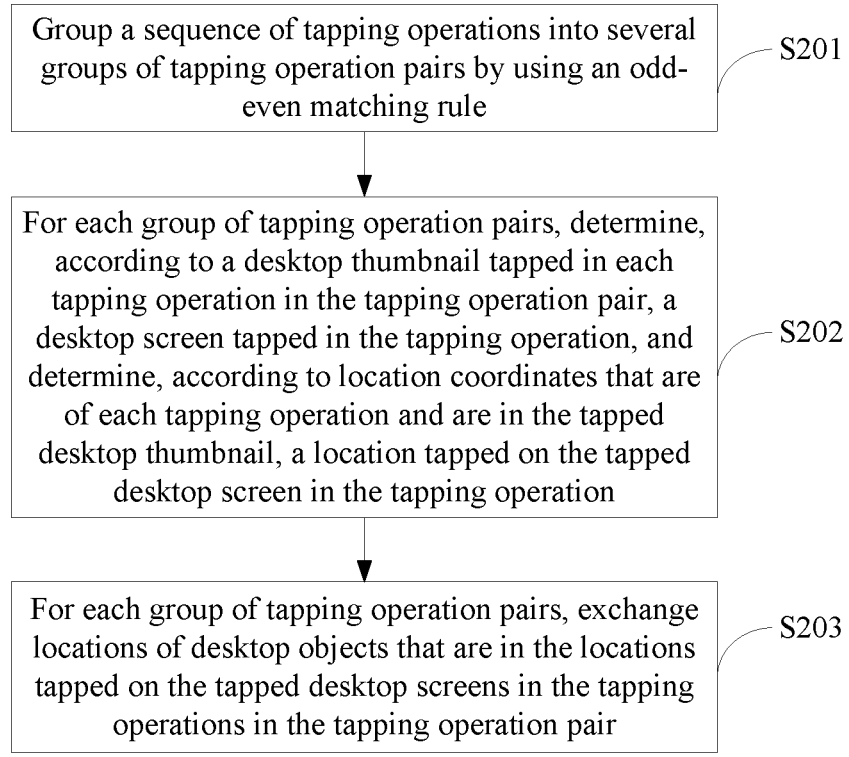
FIG. 5 is a specific flowchart of implementing S103 shown in FIG. 1 according to an embodiment of the present disclosure.

In an embodiment provided in the present disclosure, a specific process of the sorting and displaying, according to the tapping location of each tapping operation in the sequence of tapping operations, desktop objects that are on each desktop screen on the multi-screen desktop is shown in FIG. 5, and detailed descriptions are as follows.

S201. Group a sequence of tapping operations into several tapping operation pairs using an odd-even matching rule.

The odd-even matching rule refers to grouping a tapping operation of an odd time and a tapping operation of an even time into a group. A specific process of the grouping a sequence of tapping operations into several tapping operation pairs using an odd-even matching rule is as follows: grouping, according to time order of the tapping operations in the sequence of tapping operations, a tapping operation of an odd time and a tapping operation of an even time that are neighboring to each other into a tapping operation pairs. Exemplary descriptions are as follows.

It is assumed that a user consecutively performs six tapping operations on the desktop thumbnails displayed on the desktop home screen, the sequence of tapping operations includes the six tapping operations, and the six tapping operations are arranged as follows according to time order: the first tapping operation, the second tapping operation, the third tapping operation, the fourth tapping operation, the fifth tapping operation, and the sixth tapping operation. The first tapping operation, the third tapping operation, and the fifth tapping operation are tapping operations of an odd time, and the second tapping operation, the fourth tapping operation, and the sixth tapping operation are tapping operations of an even time.

When the sequence of tapping operations is grouped into several tapping operation pairs using the odd-even matching rule, the first tapping operation and the second tapping operation are group into a tapping operation pairs, the third tapping operation and the fourth tapping operation are grouped into a tapping operation pairs, and the fifth tapping operation and the sixth tapping operation are grouped into a tapping operation pairs. When the sequence of tapping operations further includes other tapping operations, the other tapping operations included in the sequence of tapping operations continue to be grouped into several tapping operation pairs according to this principle.

However, when the sequence of tapping operations includes an odd quantity of tapping operations, the last tapping operation included in the sequence of tapping operations is not involved in the grouping. For example, it is assumed that the user consecutively performs seven tapping operations on the desktop thumbnails displayed on the desktop home screen, the sequence of tapping operations includes the seven tapping operations. The first tapping operation and the second tapping operation in the sequence of tapping operations are grouped into a tapping operation pairs, the third tapping operation and the fourth tapping operation are grouped into a tapping operation pairs, the fifth tapping operation and the sixth tapping operation are grouped into a tapping operation pairs, and the seventh tapping operation in the sequence of tapping operations is not involved in the grouping.

S202. For each tapping operation pairs, determine, according to a desktop thumbnail tapped in each tapping operation in the tapping operation pair, a desktop screen tapped in the tapping operation, and determine, according to location coordinates that are of each tapping operation and are in the tapped desktop thumbnail, a location tapped on the tapped desktop screen in the tapping operation.

In this embodiment, because a desktop thumbnail displayed on a desktop home screen is in a one-to-one correspondence with a desktop screen, a desktop screen corresponding to a desktop thumbnail tapped in each tapping operation is acquired according to the desktop thumbnail tapped in the tapping operation; in this case, the desktop screen corresponding to the desktop thumbnail tapped in the tapping operation can be used as a desktop screen tapped in the tapping operation. Because a desktop object thumbnail in each desktop thumbnail is in a one-to-one correspondence with a desktop object on a corresponding desktop screen, a desktop object thumbnail tapped in the tapped desktop thumbnail in each tapping operation may be determined according to location coordinates that are of the tapping operation and are in the tapped desktop thumbnail, a desktop object corresponding to the desktop object thumbnail is acquired, and location coordinates that are of the desktop object corresponding to the desktop object thumbnail and that are on the tapped desktop screen are used as a location tapped on the tapped desktop screen in the tapping operation. Exemplary descriptions are as follows.

Figure 6:
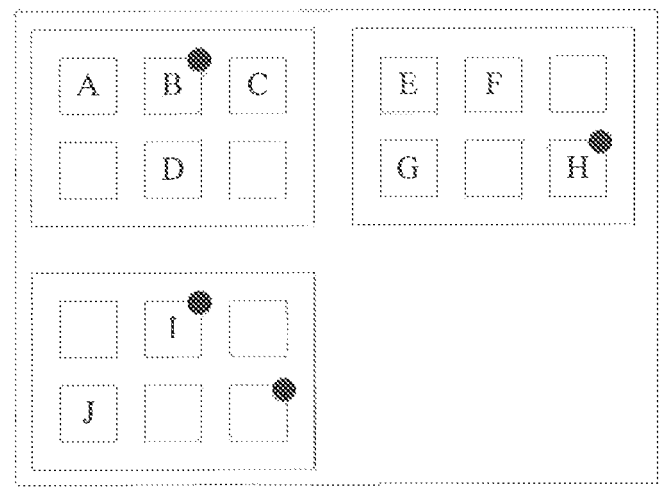
FIG. 6 is an exemplary diagram formed after a tapping operation is performed on the desktop home screen shown in FIG. 4 according to an embodiment of the present disclosure.

Referring to FIG. 6, FIG. 6 is an exemplary diagram formed after a user performs a tapping operation on the desktop home screen shown in FIG. 3. It is assumed that the user sequentially taps, on the desktop home screen shown in FIG. 6, a desktop object thumbnail B that is of location coordinates (1, 2) and that is in a desktop thumbnail whose screen identifier is 01, a desktop object thumbnail I that is of location coordinates (1, 2) and that is in a desktop thumbnail whose screen identifier is 03, a desktop object thumbnail H that is of location coordinates (2, 3) and that is in a desktop thumbnail whose screen identifier is 02, and a desktop object thumbnail that is of location coordinates (2, 3) and that is in the desktop thumbnail whose screen identifier is 03, the sequence of tapping operations includes four tapping operations, where the first tapping operation and the second tapping operation are a tapping operation pairs, and the third tapping operation and the fourth tapping operation are a tapping operation pairs. A tapping location of the first tapping operation in the tapping operation pair is (01, 1, 2), a desktop screen tapped in the first tapping operation is the desktop screen whose screen identifier is 01, and a location tapped on the tapped desktop screen in the tapping operation is (1, 2); a tapping location of the second tapping operation is (03, 1, 2), a desktop screen tapped in the second tapping operation is the desktop screen whose screen identifier is 03, and a location tapped on the tapped desktop screen in the tapping operation is (1, 2). In the other tapping operation pairs, a tapping location of the third tapping operation is (02, 2, 3), a desktop screen tapped in the third tapping operation is the desktop screen whose screen identifier is 02, and a location tapped on the tapped desktop screen in the tapping operation is (2, 3); a tapping location of the fourth tapping operation is (03, 2, 3), a desktop screen tapped in the fourth tapping operation is the desktop screen whose screen identifier is 03, and a location tapped on the tapped desktop screen in the tapping operation is (2, 3).

In another embodiment of the present disclosure, because a desktop thumbnail displayed on a desktop home screen is in a one-to-one correspondence with a desktop screen, a desktop screen corresponding to a desktop thumbnail tapped in each tapping operation is acquired according to the desktop thumbnail tapped in the tapping operation; in this case, the desktop screen corresponding to the desktop thumbnail tapped in the tapping operation can be used as a desktop screen tapped in the tapping operation. Because a relative location in a grid matrix is used for both of a location of a desktop object on a desktop screen and a location of a desktop object thumbnail in a desktop thumbnail, a location tapped on the tapped desktop screen in each tapping operation may be directly determined according to location coordinates that are of the tapping operation and are in the tapped desktop thumbnail.

S203. For each tapping operation pairs, exchange locations of desktop objects that are in the locations tapped on the tapped desktop screens in the tapping operations in the tapping operation pair.

Specifically, if a blank area is tapped in one tapping operation in the tapping operation pair, a desktop object in a location tapped in the other tapping operation in the tapping operation pair is moved to the blank area tapped in the tapping operation; if blank areas are tapped in both two tapping operations in the tapping operation pair, no location exchange processing is required.

Exemplary descriptions are as follows.

Figure 7A:
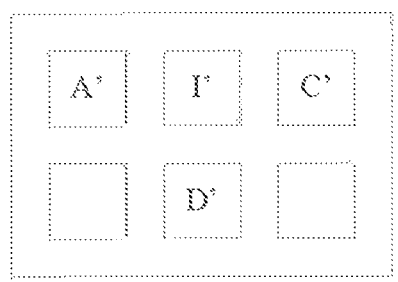
Figure 7B:
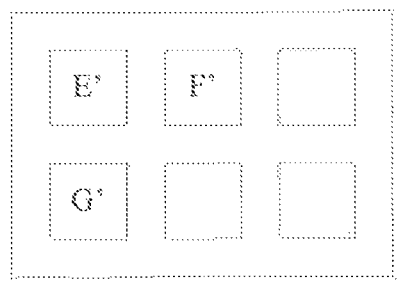

It is assumed that the user sequentially taps, on the desktop home screen shown in FIG. 6, the desktop object thumbnail B that is of location coordinates (1, 2) and that is in the desktop thumbnail whose screen identifier is 01, the desktop object thumbnail I that is of location coordinates (1, 2) and that is in the desktop thumbnail whose screen identifier is 03, the desktop object thumbnail H that is of location coordinates (2, 3) and that is in the desktop thumbnail whose screen identifier is 02, and the desktop object thumbnail that is of location coordinates (2, 3) and that is in the desktop thumbnail whose screen identifier is 03, locations of a desktop object B' on the desktop screen 01 and a desktop object I' on the desktop screen 03 are exchanged, and a desktop object H' on the desktop screen 02 is moved to a blank area that is at location coordinates (2, 3) on the desktop screen 03. After the foregoing sorting and displaying, the following may be obtained: the desktop screen 01 shown in FIG. 2A is changed into a desktop screen shown in FIG. 7A, the desktop screen shown in FIG. 2B is changed into a desktop screen shown in FIG. 7B, and the desktop screen shown in FIG. 2C is changed into a desktop screen shown in FIG. 7C.

In this embodiment, for each tapping operation pairs, a desktop screen tapped in the tapping operation and a location tapped on the tapped desktop screen are directly determined according to a tapping location of each tapping operation in the tapping operation pairs, and locations of desktop objects that are at locations tapped on the tapped desktop screens in the tapping operations of each tapping operation pairs are exchanged, so that desktop objects on each desktop screen on a multi-screen desktop can be sorted and displayed. In this way, a sorting manner is simpler and more convenient.

In another embodiment provided in the present disclosure, a specific process of the sorting and displaying, according to the tapping location of each tapping operation in the sequence of tapping operations, desktop objects that are on each desktop screen on the multi-screen desktop is shown in FIG. 8, and detailed descriptions are as follows.

S301. Group a sequence of tapping operations into several tapping operation pairs using an odd-even matching rule. A specific process is described above, and details are not described herein again.

S302. For each tapping operation pairs, determine, according to a desktop thumbnail tapped in each tapping operation in the tapping operation pair and location coordinates that are of the tapping operation and are in the tapped desktop thumbnail, a desktop object thumbnail tapped in the tapping operation.

S303. For each tapping operation pairs, exchange locations of the desktop object thumbnails tapped in the tapping operations in the tapping operation pair. Exemplary descriptions are as follows.

Figure 9:
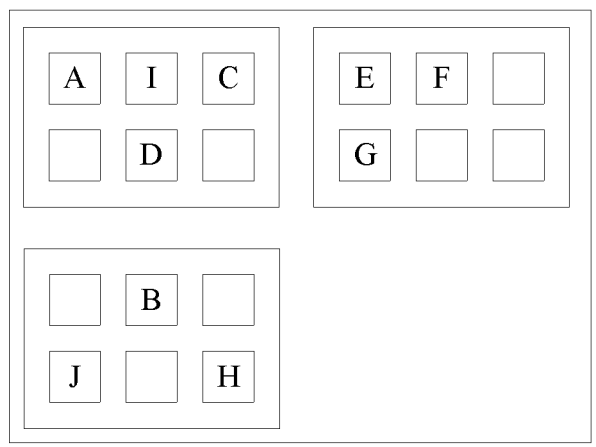
FIG. 9 is an exemplary diagram of a desktop home screen obtained after sorting desktop thumbnails on a desktop home screen shown in FIG. 6 according to an embodiment of the present disclosure.

Referring to FIG. 6, if in one group of tapping operation pairs, a tapping location of one tapping operation is (01, 1, 2) and a tapping location of the other tapping operation is (03, 1, 2); and in other group of tapping operation pairs, a tapping location of one tapping operation is (02, 2, 3) and a tapping location of the other tapping operation is (03, 2, 3), a location of a desktop object thumbnail B in a desktop thumbnail whose screen identifier is 01 in FIG. 6 and a location of a desktop object thumbnail I in a desktop thumbnail whose screen identifier is 03 are exchanged, and a desktop object thumbnail H in a desktop thumbnail whose screen identifier is 02 is moved to a desktop object thumbnail that is of location coordinates (2, 3) and that is in the desktop thumbnail whose screen identifier is 03, where the desktop object thumbnail that is of location coordinates (2, 3) and that is in the desktop thumbnail whose screen identifier is 03 is a blank area. After the foregoing sorting, the desktop thumbnail that is shown in FIG. 6 and that is on the desktop home screen is changed into a desktop thumbnail that is shown in FIG. 9 and that is on the desktop home screen.

S304. Sort and display, according to each desktop thumbnail displayed on a desktop home screen and a desktop object thumbnail included in the desktop thumbnail, desktop objects on a desktop screen that is in the desktop screen set and is corresponding to each desktop thumbnail.

Specifically, a screen identifier and second location information that are of the desktop thumbnail are acquired, where the second location information is information about a location that is of the desktop object thumbnail in the desktop thumbnail and that is in the desktop thumbnail; a desktop object that is in a one-to-one correspondence with the desktop object thumbnail in the desktop thumbnail is displayed, according to the second location information, on a desktop screen corresponding to the screen identifier.

A specific form of the second location information may be a form of the following triplet: (a screen identifier of a desktop thumbnail, an X-coordinate, and a Y-coordinate). The screen identifier of the desktop thumbnail represents a screen identifier of a desktop thumbnail to which a desktop object thumbnail belongs, and the X-coordinate and the Y-coordinate represent location coordinates that are of the desktop object thumbnail and that are in the desktop thumbnail to which the desktop object thumbnail belongs. The location coordinates are represented using a relative location in a grid matrix, where the X-coordinate represents a row coordinate, and the Y-coordinate represents a column coordinate.

Exemplary descriptions are as follows.

According to a desktop thumbnail that is displayed on the desktop home screen and that is of the screen identifier 01 and a desktop object thumbnail included in the desktop thumbnail, a desktop object corresponding to the desktop object thumbnail included in the desktop thumbnail whose screen identifier is 01 is displayed on the desktop screen 01; and when the desktop object is displayed on the desktop screen 01, the desktop object corresponding to the desktop object thumbnail is displayed on the desktop screen according to location coordinates that are of the desktop object thumbnail and that are in the desktop thumbnail. For example, after desktop objects on a desktop screen that is corresponding to each desktop thumbnail and that is in a desktop screen set are sorted and displayed according to desktop thumbnails on a desktop home screen shown in FIG. 9 and a desktop object thumbnail included in each desktop thumbnail, the desktop screen 01 shown in FIG. 7A, the desktop screen 02 shown in FIG. 7B, and the desktop screen 03 shown in FIG. 7C can be obtained.

In this embodiment, location exchange is performed according to a desktop object thumbnail tapped in each tapping operation of each tapping operation pairs, so that a user can preview sorting order of desktop objects on each desktop screen on a multi-screen desktop after location exchange is performed, and a sorting result is more intuitive, thereby improving accuracy of a sorting operation.

Figure 10:
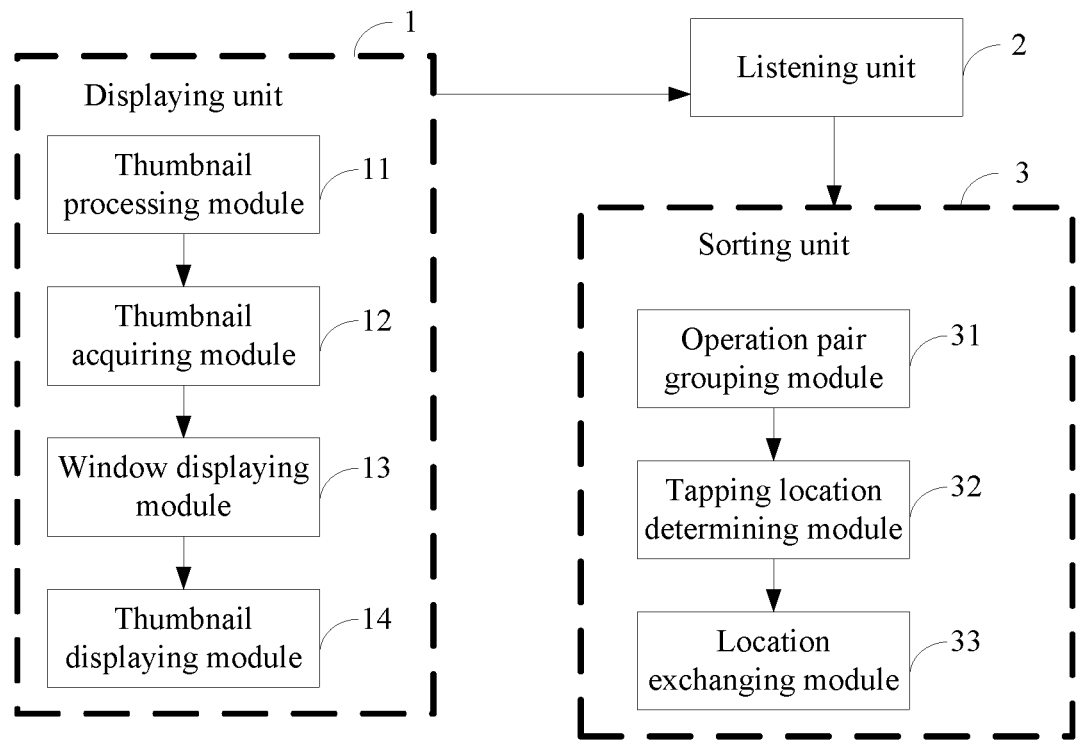
FIG. 10 is a structural diagram of a system for sorting desktop objects according to an embodiment of the present disclosure.

FIG. 10 shows a structure of a system for sorting desktop objects according to an embodiment of the present disclosure. For ease of description, only a part related to this embodiment of the present disclosure is shown.

The system may be used in a mobile terminal, for example, a smart phone, a tablet computer, or the like, or may be a software unit, a hardware unit, or a unit combining software and hardware that runs in a mobile terminal, or may be integrated into a mobile terminal or run in an application system of a mobile terminal as an independent attachment.

The system for sorting desktop objects includes a displaying unit 1 configured to acquire a desktop thumbnail of each desktop screen in a desktop screen set, and collectively display all the acquired desktop thumbnails on a desktop home screen, where the desktop screen set includes at least one desktop screen on a multi-screen desktop, the desktop thumbnail of the desktop screen includes a desktop object thumbnail that is in a one-to-one correspondence with a desktop object on the desktop screen, and the desktop home screen is any desktop screen on the multi-screen desktop; a listening unit 2 configured to listen to a sequence of tapping operations performed on the desktop thumbnails displayed on the desktop home screen, and determine a tapping location of each tapping operation in the sequence of tapping operations, where the tapping location includes a tapped desktop thumbnail and location coordinates that are of the tapping operation and are in the tapped desktop thumbnail; where the sequence of tapping operations includes several tapping operations with tapping order, each tapping operation may be performed on one or more desktop thumbnails, and each tapping operation may include multiple tapping locations; and a sorting unit 3 configured to sort and display, according to the tapping location of each tapping operation in the sequence of tapping operations, desktop objects that are on each desktop screen on the multi-screen desktop.

Further, the displaying unit 1 includes a thumbnail processing module 11 and a thumbnail acquiring module 12, where the thumbnail processing module 11 is configured to perform zooming-out processing on each desktop screen in the desktop screen set and the desktop object on the desktop screen according to a preset zoom ratio, to obtain the desktop thumbnail of each desktop screen in the desktop screen set; and the thumbnail acquiring module 12 is configured to scan the desktop thumbnail of each desktop screen in the desktop screen set, to acquire a screen identifier and first location information that are of the desktop thumbnail, where the first location information is information about a location that is of the desktop object thumbnail included in the desktop thumbnail and that is in the desktop thumbnail.

Further, the displaying unit 1 further includes a window displaying module 13 and a thumbnail displaying module 14, where the window displaying module 13 is configured to display, on the desktop home screen, a window interface that is in a one-to-one correspondence with the desktop thumbnail of each desktop screen in the desktop screen set; and the thumbnail displaying module 14 is configured to correspondingly display, according to the screen identifier of the desktop thumbnail, the acquired desktop thumbnails on the window interface that is on the desktop home screen, and display, on the desktop thumbnail according to the first location information, the desktop object thumbnail that is in the desktop thumbnail.

Further, the sorting unit 3 includes an operation pair grouping module 31, a tapping location determining module 32, and a location exchanging module 33, where the operation pair grouping module 31 is configured to group the sequence of tapping operations into several tapping operation pairs using an odd-even matching rule; the tapping location determining module 32 is configured to, for each tapping operation pairs, determine, according to a desktop thumbnail tapped in each tapping operation in the tapping operation pair, a desktop screen tapped in the tapping operation, and determine, according to location coordinates that are of each tapping operation and are in the tapped desktop thumbnail, a location tapped on the tapped desktop screen in the tapping operation; and the location exchanging module 33 is configured to, for each tapping operation pairs, exchange locations of desktop objects that are in the locations tapped on the tapped desktop screens in the tapping operations in the tapping operation pair.

Figure 11:
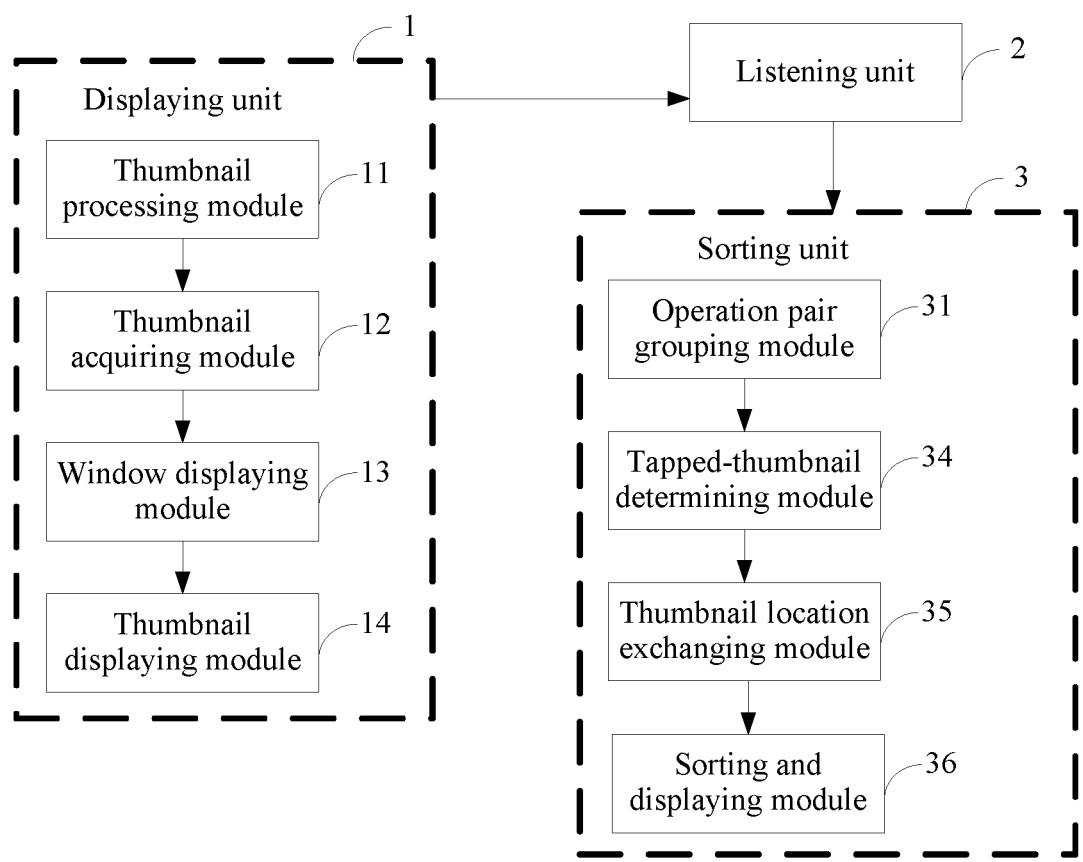
FIG. 11 is a structural diagram of a system for sorting desktop objects according to another embodiment of the present disclosure.

Further, referring to FIG. 11, the sorting unit 3 includes an operation pair grouping module 31, a tapped-thumbnail determining module 34, a thumbnail location exchanging module 35, and a sorting and displaying module 36, where the operation pair grouping module 31 is configured to group the sequence of tapping operations into several tapping operation pairs using an odd-even matching rule; the tapped-thumbnail determining module 34 is configured to, for each tapping operation pairs, determine, according to a desktop thumbnail tapped in each tapping operation in the tapping operation pair and location coordinates that are of the tapping operation and are in the tapped desktop thumbnail, a desktop object thumbnail tapped in the tapping operation; the thumbnail location exchanging module 35 is configured to, for each tapping operation pairs, exchange locations of the desktop object thumbnails tapped in the tapping operations in the tapping operation pair; and the sorting and displaying module 36 is configured to sort and display, according to each desktop thumbnail displayed on the desktop home screen and the desktop object thumbnail included in the desktop thumbnail, desktop objects on a desktop screen that is in the desktop screen set and is corresponding to the desktop thumbnail.

Further, the sorting and displaying module 36 is specifically configured to acquire a screen identifier and second location information that are of the desktop thumbnail, where the second location information is information about a location that is of the desktop object thumbnail in the desktop thumbnail and that is in the desktop thumbnail; and display, according to the second location information and on a desktop screen corresponding to the screen identifier, a desktop object that is in a one-to-one correspondence with the desktop object thumbnail in the desktop thumbnail.

Functional units or modules described in the foregoing embodiment may be configured to implement the methods in FIG. 1 to FIG. 9.

It should be noted that, units included in the foregoing system are merely divided according to functional logic but are not limited to the foregoing division provided that corresponding functions can be implemented. In addition, specific names of functional units are only used for mutual differentiation instead of limiting the protection scope of the present disclosure.

Figure 12:
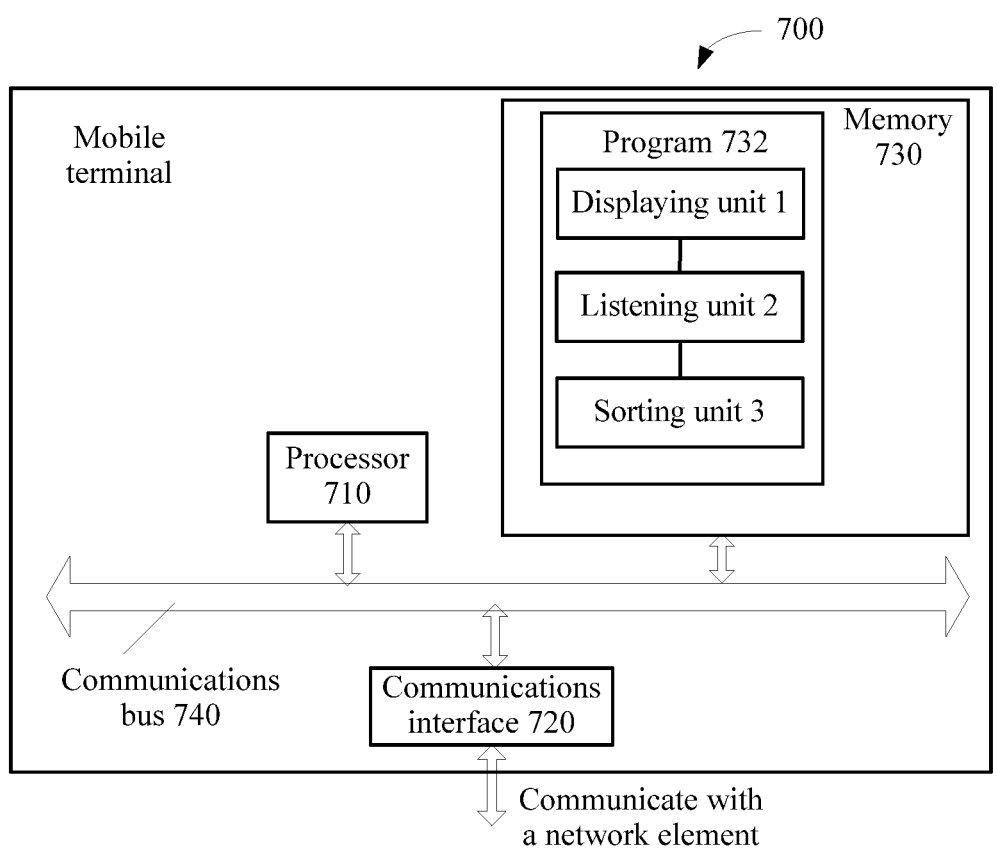
FIG. 12 is a schematic diagram of a mobile terminal according to an embodiment of the present disclosure.

Referring to FIG. 12, FIG. 12 is a schematic diagram of a mobile terminal 700 according to an embodiment of the present disclosure. The mobile terminal 700 may be a smart phone, a tablet computer, or the like, and specific implementation of the mobile terminal 700 is not limited in a specific embodiment of the present disclosure. The mobile terminal 700 includes a processor 710, a communications interface 720, a memory 730, and a bus 740.

The processor 710, the communications interface 720, and the memory 730 perform mutual communication using the bus 740.

The communications interface 720 is configured to communicate with a network element, for example, a virtual machine management center 280 or a shared memory 240.

The processor 710 is configured to execute a program 732.

Specifically, the program 732 may include program code, where the program code includes a computer operation instruction.

The processor 710 may be a central processing unit (CPU), an application-specific integrated circuit (ASIC), or one or more integrated circuits configured to implement this embodiment of the present disclosure.

The memory 730 is configured to store the program 732. The memory 730 may include a high speed random-access memory (RAM), or may further include a non-volatile memory, for example, at least one magnetic disk memory. The program 732 may specifically include a displaying unit 1 configured to acquire a desktop thumbnail of each desktop screen in a desktop screen set, and collectively display all the acquired desktop thumbnails on a desktop home screen, where the desktop screen set includes at least one desktop screen on a multi-screen desktop, the desktop thumbnail of the desktop screen includes a desktop object thumbnail that is in a one-to-one correspondence with a desktop object on the desktop screen, and the desktop home screen is any desktop screen on the multi-screen desktop; a listening unit 2 configured to listen to a sequence of tapping operations performed on the desktop thumbnails displayed on the desktop home screen, and determine a tapping location of each tapping operation in the sequence of tapping operations, where the tapping location includes a tapped desktop thumbnail and location coordinates that are of the tapping operation and are in the tapped desktop thumbnail; and a sorting unit 3 configured to sort and display, according to the tapping location of each tapping operation in the sequence of tapping operations, desktop objects that are on each desktop screen on the multi-screen desktop.

For specific implementation of units in the program 732, reference is made to corresponding units in the embodiment shown in FIG. 10 to FIG. 11, and details are not described herein again.

It may be clearly understood by a person skilled in the art that, for the purpose of convenient and brief description, for a detailed working process of the foregoing system and unit, reference may be made to a corresponding process in the foregoing method embodiments, and details are not described herein again.

A person of ordinary skill in the art may understand that all or a part of the steps of the methods in the embodiments may be implemented by a program instructing relevant hardware. The program may be stored in a computer readable storage medium, such as a read-only memory (ROM), a RAM, a magnetic disk, or an optical disc.

In the embodiments of the present disclosure, desktop thumbnails of desktop screens on a multi-screen desktop are collectively displayed on a desktop home screen, so that a desktop object thumbnail in the desktop thumbnail may be directly tapped on the desktop home screen to exchange locations of desktop objects on a same desktop screen or exchange locations of desktop objects on different desktop screens. Therefore, a sorting operation on desktop objects is simple, consumes less time, and has high locating accuracy. Location exchange is performed according to a desktop object thumbnail tapped in each tapping operation of each tapping operation pairs, so that a user can preview sorting order of desktop objects on each desktop screen on the multi-screen desktop after location exchange is performed, and a sorting result is more intuitive, thereby improving accuracy of a sorting operation.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope

The invention claimed is:

1. A method for sorting desktop objects, comprising:
    displaying a first desktop screen that comprises a first object at a first location of the first desktop screen;
    displaying a second desktop screen that comprises a second object at a second location of the second desktop screen;
    collectively displaying a desktop screen set, wherein the desktop screen set comprises a first desktop thumbnail corresponding to the first desktop screen and a second desktop thumbnail corresponding to the second desktop screen, wherein the first object is displayed as a first object thumbnail at a third location on the first desktop thumbnail, and wherein the second object is displayed as a second object thumbnail at a fourth location on the second desktop thumbnail;
    receiving a first sequential tapping operation on the first object thumbnail and the second object thumbnail, wherein the first sequential tapping operation comprises a sequence of tapping operations performed on the first object thumbnail and the second object thumbnail;
    determining, based on the sequence of tapping operations, a first tapping location of the first object thumbnail in the first desktop thumbnail and a second tapping location of the second object thumbnail in the second desktop thumbnail, wherein the first tapping location comprises a first screen identifier representing the first desktop thumbnail and a first tapping location indicating the third location of the first object thumbnail on the first desktop thumbnail, wherein the second tapping location comprises a second screen identifier representing the second desktop thumbnail and a second tapping location indicating the fourth location of the second object thumbnail on the second desktop thumbnail, wherein the first tapping location comprises a first X-coordinate representing a first row in a first relative grid matrix for representing locations in the first desktop thumbnail and comprises a first Y-coordinate representing a first column in the first relative grid matrix, and wherein the second tapping location comprises a second X-coordinate representing a second row in a second relative grid matrix for representing locations in the second desktop thumbnail and comprises a second Y-coordinate representing a second column in the second relative grid matrix;

exchanging locations of the first object thumbnail and the second object thumbnail by displaying the first object thumbnail at the fourth location on the second desktop thumbnail and displaying the second object thumbnail at the third location on the first desktop thumbnail, wherein exchanging the locations of the first object thumbnail and the second object thumbnail comprises exchanging the first tapping location and the second tapping location; and exchanging, according to the exchanging of the first tapping location and the second tapping location, locations of the first object and the second object by displaying the first object at the second location of the second desktop screen and displaying the second object at the first location of the first desktop screen.

2. The method of claim 1, further comprising receiving a plurality of sequential tapping operations, wherein each sequential tapping operation is performed on one or more desktop thumbnails.

3. The method of claim 2, further comprising exchanging locations of object thumbnails based on the plurality of sequential tapping operations.

4. The method of claim 1, further comprising:
receiving a sequence of tapping operations on one or more desktop thumbnails;
grouping the sequence of tapping operations into at least one tapping operation pair using an odd-even matching rule; and
exchanging a fifth position of a third object thumbnail with a sixth position of a fourth object thumbnail based on each tapping operation pair of the at least one tapping operation pair.

5. The method of claim 1, further comprising:
performing zoom-out processing on the first desktop screen, the first object on the first desktop screen, the second desktop screen, and the second object on the second desktop screen according to a preset zoom ratio;
obtaining the first desktop thumbnail corresponding to the first desktop screen and the second desktop thumbnail corresponding to the second desktop screen; and
obtaining the first object thumbnail corresponding to the first object and the second object thumbnail corresponding to the second object.

6. The method of claim 1, further comprising:
receiving a second sequential tapping operation on the first object thumbnail and a first blank area at a fifth location of the second desktop screen; and
displaying the first object thumbnail at the fifth location of the second desktop thumbnail.

7. The method of claim 1, further comprising:
receiving a third sequential tapping operation on a second blank area at a sixth location of the second desktop screen and the first object thumbnail; and
displaying the first object thumbnail at the sixth location of the second desktop thumbnail.

8. An apparatus, comprising:
a processor; and
a memory coupled to the processor and configured to store programming instructions that, when executed by the processor, cause the apparatus to:
display a first desktop screen that comprises a first object at a first location of the first desktop screen;
display a second desktop screen that comprises a second object at a second location of the second desktop screen;
collectively display a desktop screen set, wherein the desktop screen set comprises a first desktop thumbnail corresponding to the first desktop screen and a second desktop thumbnail corresponding to the second desktop screen, wherein the first object is displayed as a first object thumbnail at a third location on the first desktop thumbnail, and wherein the second object is displayed as a second object thumbnail at a fourth location on the second desktop thumbnail;
receive a first sequential tapping operation on the first object thumbnail and the second object thumbnail, wherein the first sequential tapping operation comprises a sequence of tapping operations performed on the first object thumbnail and the second object thumbnail;
determine, based on the sequence of tapping operations, a first tapping location of the first object thumbnail in the first desktop thumbnail and a second tapping location of the second object thumbnail in the second desktop thumbnail, wherein the first tapping location comprises a first screen identifier representing the first desktop thumbnail and a first tapping location indicating the third location of the first object thumbnail on the first desktop thumbnail, wherein the second tapping location comprises a second screen identifier representing the second desktop thumbnail and a second tapping location indicating the fourth location of the second object thumbnail on the second desktop thumbnail, wherein the first tapping location comprises a first X-coordinate representing a first row in a first relative grid matrix for representing locations in the first desktop thumbnail and comprises a first Y-coordinate representing a first column in the first relative grid matrix, and wherein the second tapping location comprises a second X-coordinate representing a second row in a second relative grid matrix for representing locations in the second desktop thumbnail and comprises a second Y-coordinate representing a second column in the second relative grid matrix;
exchange locations of the first object thumbnail and the second object thumbnail by displaying the first object thumbnail at the fourth location on the second desktop thumbnail and displaying the second object at the third location on the first desktop thumbnail, wherein exchanging the locations of the first object thumbnail and the second object thumbnail comprises exchanging the first tapping location and the second tapping location; and exchange, according to the exchanging of the first tapping location and the second tapping location, locations of the first object and the second object by displaying the first object at the second location of the second desktop screen and displaying the second object at the first location of the first desktop screen.

9. The apparatus of claim 8, wherein the programming instructions further cause the apparatus to receive a plurality of sequentially tapping operations, and wherein each sequential tapping operation is performed on one or more desktop thumbnails.

10. The apparatus of claim 9, wherein the programming instructions further cause the apparatus to exchange locations of object thumbnails based on the plurality of sequential tapping operations.

11. The apparatus of claim 8, wherein the programming instructions further cause the apparatus to:
receive a sequence of tapping operations on one or more desktop thumbnails;
group the sequence of tapping operations into at least one tapping operation pair using an odd-even matching rule; and
swap a fifth position of a third object thumbnail with a sixth position of a fourth object thumbnail based on each tapping operation pair of the at least one tapping operation pair.

12. The apparatus of claim 8, wherein the programming instructions further cause the apparatus to:
perform zoom-out processing on the first desktop screen, the first object on the first desktop screen, the second desktop screen, and the second object on the second desktop screen according to a preset zoom ratio;
obtain the first desktop thumbnail corresponding to the first desktop screen and the second desktop thumbnail corresponding to the second desktop screen; and
obtain the first object thumbnail corresponding to the first object and the second object thumbnail corresponding to the second object.

13. The apparatus of claim 8, wherein the programming instructions further cause the apparatus to:
receive a second sequential tapping operation on the first object thumbnail and a first blank area at a fifth location of the second desktop screen; and
display the first object thumbnail at the fifth location of the second desktop thumbnail.

14. The apparatus of claim 8, wherein the programming instructions further cause the apparatus to:
receive a third sequential tapping operation on a second blank area at a sixth location of the second desktop screen and the first object thumbnail; and
display the first object thumbnail at the sixth location of the second desktop thumbnail.

15. A computer program product comprising computer-executable instructions stored on a non-transitory computer-readable storage medium that, when executed by a processor, cause an apparatus to:
display a first desktop screen that comprises a first object at a first location of the first desktop screen;
display a second desktop screen that comprises a second object at a second location of the second desktop screen;
collectively display a desktop screen set, wherein the desktop screen set comprises a first desktop thumbnail corresponding to the first desktop screen and a second desktop thumbnail corresponding to the second desktop screen, wherein the first object is displayed as a first object thumbnail at a third location on the first desktop thumbnail, and wherein the second object is displayed as a second object thumbnail at a fourth location on the second desktop thumbnail;
receive a first sequential tapping operation on the first object thumbnail and the second object thumbnail, wherein the first sequential tapping operation comprises a sequence of tapping operations performed on the first object thumbnail and the second object thumbnail;
determine, based on the sequence of tapping operations, a first tapping location of the first object thumbnail in the first desktop thumbnail and a second tapping location of the second object thumbnail in the second desktop thumbnail, wherein the first tapping location comprises a first screen identifier representing the first desktop thumbnail and a first tapping location indicating the third location of the first object thumbnail on the first desktop thumbnail, wherein the second tapping location comprises a second screen identifier representing the second desktop thumbnail and a second tapping location indicating the fourth location of the second object thumbnail on the second desktop thumbnail, wherein the first tapping location comprises a first X-coordinate representing a first row in a first relative grid matrix for representing locations in the first desktop thumbnail and comprises a first Y-coordinate representing a first column in the first relative grid matrix, and wherein the second tapping location comprises a second X-coordinate representing a second row in a second relative grid matrix for representing locations in the second desktop thumbnail and comprises a second Y-coordinate representing a second column in the second relative grid matrix;
exchange locations of the first object thumbnail and the second object thumbnail by displaying the first object thumbnail at the fourth location on the second desktop thumbnail and displaying the second object at the third location on the first desktop thumbnail, wherein exchanging the locations of the first object thumbnail and the second object thumbnail comprises exchanging the first tapping location and the second tapping location; and
exchange, according to the exchanging of the first tapping location and the second tapping location, locations of the first object and the second object by displaying the first object at the second location of the second desktop screen and displaying the second object at the first location of the first desktop screen.

16. The computer program product of claim 15, wherein the computer-executable instructions further cause the apparatus to receive a plurality of sequential tapping operations, and wherein each sequential tapping operation is performed on one or more desktop thumbnails.

17. The computer program product of claim 16, wherein the computer-executable instructions further cause the apparatus to exchange locations of object thumbnails based on the plurality of sequential tapping operations.

18. The computer program product of claim 15, wherein the computer-executable instructions further cause the apparatus to:
receive a sequence of tapping operations on one or more desktop thumbnails;
group the sequence of tapping operations into at least one tapping operation pair using an odd-even matching rule; and swap a fifth position of a third object thumbnail with a sixth position of a fourth object thumbnail based on each tapping operation pair of the at least one tapping operation pair.

19. The computer program product of claim 15, wherein the computer-executable instructions further cause the apparatus to:
   perform zoom-out processing on the first desktop screen, the first object on the first desktop screen, the second desktop screen, and the second object on the second desktop screen according to a preset zoom ratio;
   obtain the first desktop thumbnail corresponding to the first desktop screen and the second desktop thumbnail corresponding to the second desktop screen; and
   obtain the first object thumbnail corresponding to the first object and the second object thumbnail corresponding to the second object.

20. The computer program product of claim 15, wherein the computer-executable instructions further cause the apparatus to:
   receive a second sequential tapping operation on the first object thumbnail and a first blank area at a fifth location of the second desktop screen; and
   display the first object thumbnail at the fifth location of the second desktop thumbnail.

\* \* \* \* \*